United States Patent [19]
Warner

[11] Patent Number: 4,963,044
[45] Date of Patent: Oct. 16, 1990

[54] TYPEWRITER KEYBOARD

[76] Inventor: Samuel R. Warner, 16-N Village Green, Budd Lake, N.J. 07828

[21] Appl. No.: 411,008

[22] Filed: Sep. 22, 1989

[51] Int. Cl.⁵ .............................................. B41J 5/10
[52] U.S. Cl. .................................... 400/486; 400/472
[58] Field of Search ............... 400/472, 473, 474, 485, 400/486, 487, 489; 434/169

[56] References Cited

U.S. PATENT DOCUMENTS

| | | | |
|---|---|---|---|
| 761,179 | 5/1904 | Pilsatneeks | 400/474 |
| 4,358,278 | 11/1982 | Goldfarb | 434/169 |
| 4,615,629 | 10/1986 | Power | 400/486 |
| 4,753,439 | 6/1988 | O'Brian | 434/169 |

FOREIGN PATENT DOCUMENTS

| | | | |
|---|---|---|---|
| 1292367 | 10/1972 | United Kingdom | 400/486 |
| 2110163 | 6/1983 | United Kingdom | 400/472 |

Primary Examiner—Edgar S. Burr
Assistant Examiner—Ren Yan
Attorney, Agent, or Firm—Mathews, Woodbridge & Collins

[57] ABSTRACT

A keyboard layout which has the letters, the numbers 0 to 9, and the punctuation marks disposed within four horizontal rows. The letters are disposed on first and second contiguous rows in alphabetical order from left to right with respect to all other letters on each of said rows. The numbers 0 to 9 are disposed on a third row, and the punctuation marks are disposed on the fourth row.

4 Claims, 1 Drawing Sheet

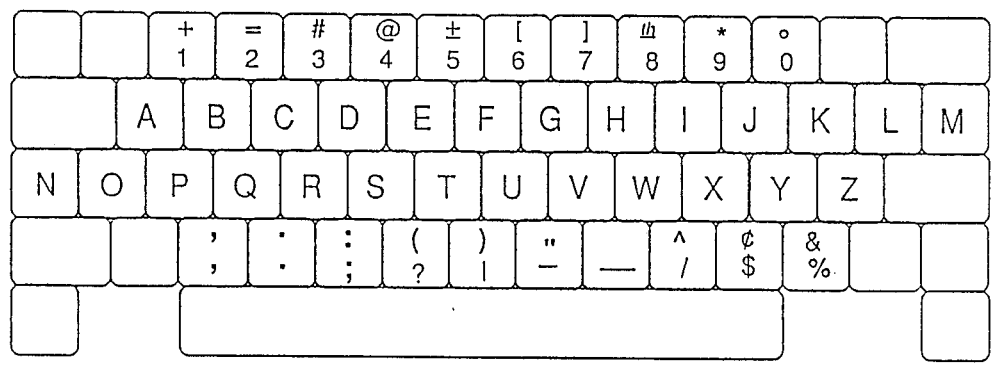

TYPEWRITER KEYBOARD

FIELD OF THE INVENTION

This invention pertains to a full size typewriter type keyboard layout designed for use by the non-skilled typist.

BACKGROUND OF THE INVENTION

In computer keyboards, there are keys added for specific computer functions, that is, functions other than the entry of letters, numbers, punctuation marks and symbols found on the standard typewriter keyboard. Each manufacturer has differently arranged keys for the computer functions; the basic typewriter keyboards generally, however, are the same for all.

The common typewriter keyboard layout has a haphazard letter arrangement. Punctuation marks, sharing the same typewriter keys with numbers and symbols, are disposed in three different rows. This layout has been in use for over 100 years, with little or no change. This arrangement was deliberate in order to slow down the typist and avoid the jams common with the early typewriters. It requires long periods of constant typing, however, without looking at the keyboard, to develop speed and accuracy and even short periods of non-use can significantly diminish the acquired skill. The common keyboard layout is frustrating, timeconsuming, and prone to errors. It is, for example, eyestraining and tiring to continually scan the keyboard to locate each correct key to strike. The average non-skilled typist does not have the time, or may not have any reason, to acquire a skill not continuously used and which quickly deteriorates unless frequently used.

The advent of the computer, used by millions of people in all business and personal endeavors, and by millions of students, has created many non-skilled typists who must use the keyboard tied to the computer.

U.S. Pat. No. 3,920,979 to Kilbey et al. shows an electronic check writer.

U.S. Pat. No. 4,180,337 to Otey et al. shows a keyboard in which letters serve a double purpose for numbers, with emphasis on keys representing vowels.

U.S. Pat. No. 4,358,278 to Goldfarb shows a special purpose machine called learning and matching apparatus and method.

U.S. Pat. No. 4,411,628 to Laughon et al. shows an electronic learning aid with picture book, held in one hand.

U.S. Pat. No. 4,555,193 to Stone discloses a keyboard with color coding, apparently used to obtain desired beverage from a dispenser.

U.S. Pat. No. 4,615,629 to Power shows a small portable elongated keyboard of 14 rows to be held in one hand for operation by the other hand for input into computer devices.

German Patent No. 25 17,555 discloses an office machine with the keyboard divided into letters on left side and numbers on right side.

BRIEF DESCRIPTION OF THE DRAWING

FIG. 1 is a top plan view of the keyboard according to the invention.

DETAILED DESCRIPTION

The present invention pertains to a practical and useful keyboard layout designed for the non-skilled typist, who must look at the keyboard when typing. All 26 letters are arranged in alphabetical order and in only two rows, simplifying the rapid selection of the correct key to facilitate entry of information faster and with greater accuracy. Because the letter order of the alphabet is never forgotten, the location of each letter is always known. The letter order of the alphabet thus is as old as the written language and well-known to everyone who can read and write. In a keyboard where all the letters are in alphabetical order, there is no time lost searching for the correct key to strike, since its location is always known, provided the letters are not in many rows. Fewer lines make for quick and accurate selection of what we look for. Therefor, it is important for all the letters to be in as few rows as possible.

All punctuation marks are disposed in just one row, again for quick selection of the correct key.

Punctuation marks should not share the same keys with numbers and symbols. All the punctuation marks are concentrated in just one row for rapid and accurate selection.

Numbers in numerical order also are in one row, with miscellaneous printing symbols in upper case (or shift mode). This is the logical layout for the non-skilled typist because time is not lost searching the keyboard. This layout is always remembered and does not require use to retain efficiency. Typing becomes simple and easy for the average non-skilled person.

What is claimed is:

1. In a keyboard layout having non-shift and shift modes, the improvement which consists of disposing (i) the letters, (ii) the numbers 0 to 9, and (iii) the punctuation marks within a total of four horizontal rows, the letters being disposed on first and second contiguous rows in alphabetical order from left to right with respect to all other letters on each of said rows, the numbers 0 to 9 being disposed on a third of said four rows, and the punctuation marks being disposed on a fourth of said four rows.

2. A keyboard layout according to claim 1 in which miscellaneous printing symbols are distributed between (i) the row of said four rows carrying said numbers for activation in the shift mode and (ii) on the row of said four rows carrying said punctuation marks.

3. A keyboard layout according to claim 1 in which said first and second of said four rows are interposed between said third and fourth of said four rows.

4. A keyboard layout according to claim 3 in which the letters A through M are disposed on said first of said four rows and the letters N through Z are disposed on said second of said four rows.

* * * * *